US008300792B2

(12) United States Patent
Sennett et al.

(10) Patent No.: US 8,300,792 B2
(45) Date of Patent: Oct. 30, 2012

(54) CHANGING ASSIGNED PRIORITY OF ACTIVE VOICE OR DATA SESSION

(75) Inventors: DeWayne Allan Sennett, Redmond, WA (US); Brian Kevin Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1010 days.

(21) Appl. No.: 12/120,510

(22) Filed: May 14, 2008

(65) Prior Publication Data

US 2009/0285377 A1 Nov. 19, 2009

(51) Int. Cl.
H04M 3/42 (2006.01)
(52) U.S. Cl. ............ 379/208.01; 379/161; 379/215.01; 379/218.01; 455/435.3; 455/512; 455/527; 455/166.2
(58) Field of Classification Search ............ 379/208.01, 379/221.01, 215.01
See application file for complete search history.

(56) References Cited

U.S. PATENT DOCUMENTS

| | | | | |
|---|---|---|---|---|
| 4,885,780 A * | 12/1989 | Gopal et al. | ............ | 379/221.01 |
| 6,175,621 B1 * | 1/2001 | Begeja | ............ | 379/208.01 |
| 6,697,479 B1 * | 2/2004 | Barnes et al. | ............ | 379/215.01 |
| 6,937,880 B2 * | 8/2005 | Teranishi | ............ | 455/567 |
| 7,724,671 B2 * | 5/2010 | Midtun et al. | ............ | 370/236 |
| 2001/0014095 A1 * | 8/2001 | Kawahata et al. | ............ | 370/392 |
| 2002/0196328 A1 * | 12/2002 | Piotrowski | ............ | 348/14.12 |
| 2005/0070230 A1 * | 3/2005 | Das et al. | ............ | 455/69 |
| 2006/0168336 A1 * | 7/2006 | Koyanagi et al. | ............ | 709/240 |
| 2007/0225012 A1 * | 9/2007 | Chang et al. | ............ | 455/452.2 |
| 2008/0070522 A1 * | 3/2008 | Marriott et al. | ............ | 455/150.1 |
| 2009/0215411 A1 * | 8/2009 | Tucker et al. | ............ | 455/90.2 |

FOREIGN PATENT DOCUMENTS

WO  WO 00/79719 A2  12/2000
WO  WO 2008/031919 A1  3/2008

OTHER PUBLICATIONS

NPSTC Broadband Working Group, "Public Safety 700MHz Broadband Statement of Requirements Version 0.6", Nov. 8, 2007, pp. 1-53.
European Patent Application No. 09160216.9: Extended European Search Report dated Nov. 5, 2009, 9 pages.

* cited by examiner

Primary Examiner — Joseph J Nguyen
(74) Attorney, Agent, or Firm — Woodcock Washburn LLP

(57) ABSTRACT

An active call between two parties can be established as a call having priority over other users in a tiered priority system. Changes to the level of priority are permitted if made by an authorized user in attendance on the active call. The change of call priority can be to either raise or lower the priority based on call circumstances. If approved, the new active call priority level is propagated to other nodes and switches so that system knowledge of the new priority level is consistent. The new priority level is reset to the pre-established call priority level after the active call is completed.

14 Claims, 6 Drawing Sheets

CHANGING ASSIGNED PRIORITY OF ACTIVE VOICE OR DATA SESSION

TECHNICAL FIELD

The technical field generally relates to communications systems and more specifically relates to a priority change system for active calls for authorized users.

BACKGROUND

Part of the spectrum centered about 700 MHz is allocated for public use. Normally, public use calls are established, conducted, and terminated without interruption. However, during emergency situations, the available bandwidth may become fully used. In such a situation, some "priority" users may be able to terminate an existing call by preemption. During preemption, any call may be terminated to allow a "high priority" user to conduct a call. Even users who have a pre-established call priority level may have their calls preempted by higher priority users. Yet, some pre-established priority level calls are of such importance that they should not be terminated by higher priority calls. Such calls may include calls whose premature termination can result in a greater hazard because of the premature termination. Today, no method of changing call priority exists for an active call in the 700 MHz band or any other public use frequency band.

SUMMARY

The present invention includes a system and method to allow an authorized user to change the priority of an active call from a pre-established level to another level. Such priority level changes can be to either increase or decrease the priority level. Only authorized users may change a pre-established priority level on an active call and such changes are propagated through the network so that all nodes and switches are informed of the new call priority level. After the active call is terminated, the new level is reset to the former pre-established call priority level for the user.

BRIEF DESCRIPTION OF THE DRAWINGS

The foregoing and other objects, aspects and advantages of dynamic allocation of communications resources will be better understood from the following detailed description with reference to the drawings.

DETAILED DESCRIPTION OF ILLUSTRATIVE EMBODIMENTS

Figure 1:
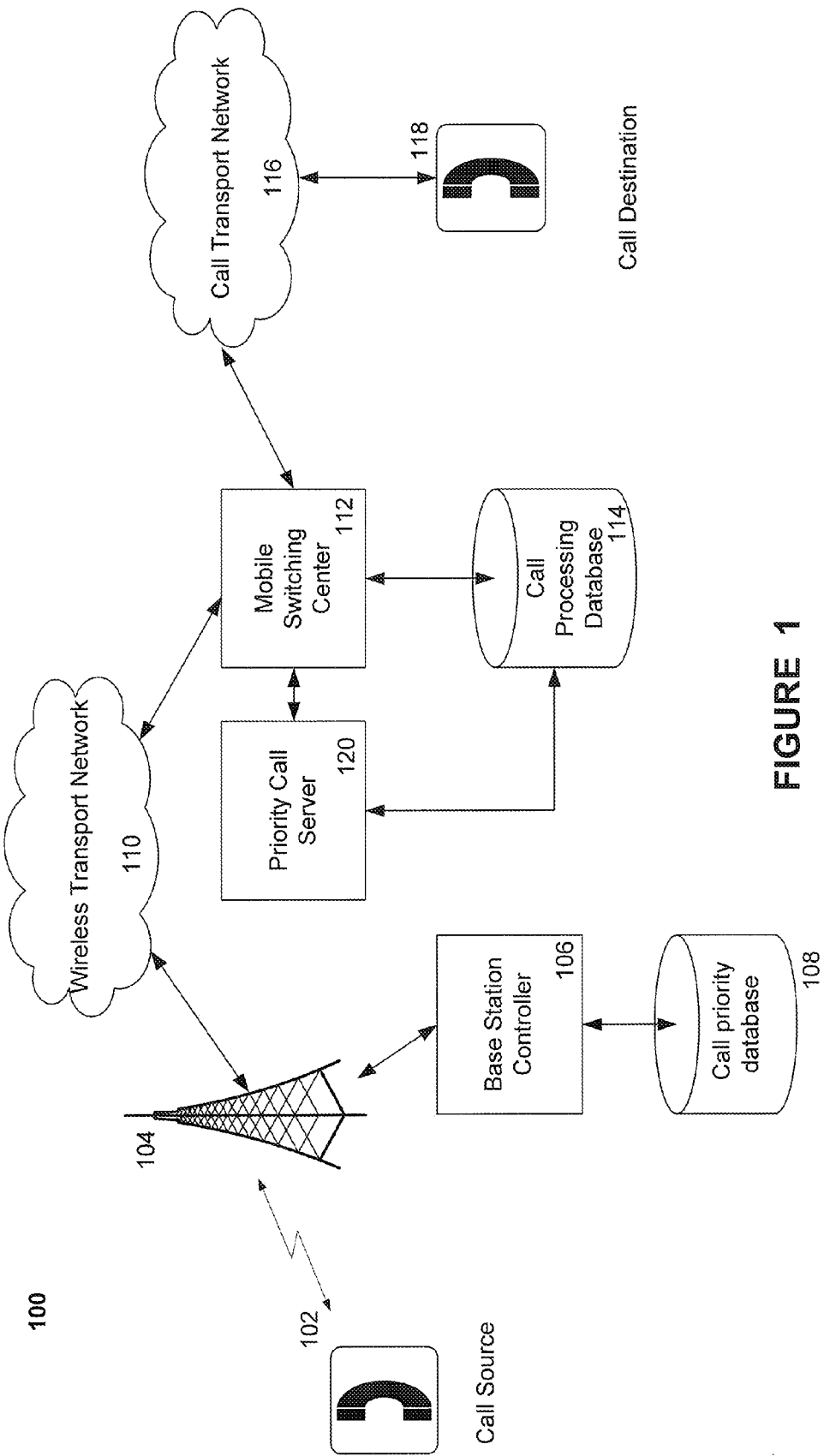
FIG. 1 is an example system diagram for call priority changes for an active call using a wireless system.

FIG. 1 is a diagram of an example priority call system in which the invention may be practiced. FIG. 1 depicts a wireless system 100. But, the system could be any communications system used in public service. For example a standard Public Switched Telephone Network (PSTN) may be used as the system embodying the principles of the invention. A customized or secure communications network that may be used for public emergency communications services may also embody the present invention. In the present description a wireless network can serve as the basis for discussion of the aspects of the invention.

Returning to FIG. 1, a remote phone or call source equipment 102, can make a call, either data or voice or both to a call destination 118. The source call equipment can be any of a mobile phone, a fixed phone, a computer terminal, or other telephone communication equipment or device. For example, an emergency-type call can be made by an individual to a destination 118. Under such programs as the Wireless Priority Service (WPS) of the National Communications System in the Department of Homeland Security, some wireless users can have a pre-established level of priority to make a call. The WPS is a system in the United States that allows high-priority emergency telephone calls to avoid congestion on wireless telephone networks. For example, during a local or national emergency, wireless telephone networks are likely to become congested with calls. Even absent emergencies, some towers and networks receive more calls than they can handle. WPS allows high-priority calls to receive priority treatment. There are seven priority levels and these levels include such individuals as executive leadership and policy makers, disaster response individuals including military command and control, public health, safety, and law enforcement command personnel, public services and utilities and public welfare personnel, and disaster recovery personnel.

In a system that is compatible with services like the WPS, each priority call user must be pre-authorized to use the system and is assigned a priority level appropriate for the user's requirements. This assigned priority level is then becomes a pre-established priority level for users of the call priority system. In some embodiments, an authorized user or call source 102, dials into the priority system and may send a control message, such as a vertical service code, star code, or the like, via a base station antenna 104 and a wireless transport network 110. The wireless network routes the call to a mobile switching center 112. At the mobile switching center, a call processing database 114 and priority call server work in conjunction to determine if the caller is authorized to use the call priority system and has a pre-established priority level. If the caller is so authorized, the call is connected to a destination station 118, via a call transport network. It is under these conditions of an active priority call of pre-established level that the present invention may be exercised.

In some situations, a call, being either a voice call or a data call, may become so important as to exceed its present, pre-established priority level. Here, the present invention enables the authorized user of the priority call system to request a higher priority level for the current active call. For example, consider a telemetry session between a paramedic in the field and a hospital, wherein telemetry data indicative of the patient's vital signs are being sent to the hospital. The session may start having a low priority represented by the pre-established priority level of the call initiator. As the patient's condition worsens and possibly becomes life threatening, it would not be appropriate for the telemetry session to be preempted easily. In another example, a police officer, having started a voice session with the police barracks, may want to send streaming video of a hostage situation. The streaming video is not appropriate for preemption by a higher priority level call. In these instances, a request for a higher priority may be requested by the authorized user. If granted, the new, higher priority level of the active call would prevent lower priority level calls from possible premature termination of the active call having the new, higher priority. Other situations may result where the importance of the call does not justify the present pre-established call priority level of the active call. In this situation, the present invention enables a user to request a lower priority level for the active call. This allows the use of judgment by the user to allow more important calls a preemptive possibility while still retaining some level of priority.

Using the current invention, an authorized priority call user can change the assigned priority of an active call session. In an example embodiment, an authorized entity initiates the change in priority of the active session. The change in priority can be from a lower to higher priority, or a higher priority to lower priority. For example, the authorized entity can be a public safety user, (e.g., a police officer, paramedic). The public safety user can, via his/her handset, initiate the change in the priority of a current session. The signaling could proceed from this handset to the call processing system (i.e. mobile switching center 112 and related equipment) on the priority call network 100 which would validate the request and then adjust the associated priority. A call session can comprise any type of session such as a voice connection, a data connection such as telematics, medical monitor devices, or a multimedia connection for video devices, or the like. This invention is applicable to any type of wireline, wireless, or VoIP type sessions including signaling methodology such as SS7, ISUP, SIP, SMS, DTMF, or the like.

To facilitate aspects of the invention in the wireless network, a call made to or by source equipment 102 would pass through a base station tower 104 connected to a base station controller (BSC) 106. It is noted that the terminology BSC may normally be used in association with a Global System for Mobil Communications (GSM) based system. However, the invention is not limited to GSM systems. A Universal Mobile Telecommunications System (UTMS) has a cell tower controller mechanism referred to as a Radio Network Controller (RNC). All types of mobile systems that include cell tower controllers are considered applicable to the present invention. For the sake of simplicity, the term BSC will be used as an example cell tower controller mechanism for the functions of item 106. Returning to FIG. 1, a call placed by the remote phone 102 would then pass via the BSC 106, through the wireless transport network 110 to a mobile switching center (MSC) 112. Essentially, the MSC is the main switching point for the initiated call. Here, the priority call is authenticated and routed to its destination with the aid of a priority call server 120 using a call processing database 114. The mobile switching center can then direct the call to the destination 118. For the sake of simplicity, it is assumed the mobile switching center 112 delivers the call to the authorized agency 118 via the call transport network 116. This network may be either a wireless connection of a connection to a PSTN or other public or private network to access the authorized agency 118.

If the caller, or authorized personnel decide that the pre-established priority level of the call should be changed, the authorized user can send a control signal from the calling equipment 102 back to the MSC 112 where the signal would be intercepted by the priority call server (PCS) 120. The PCS 120 can be co-located with the MSC but can also be located remotely. The PCS 120 can accept the signal request, authenticate the requester, and determine if a change of priority is possible. Restrictions on call priority elevation may occur, for example, if the call priority was already at the highest level and the request is for a higher level. Also, there may be restraints placed on the elevation of call priority based on the traffic of higher priority users. The restrictions may be put in place by a government or other authority as needed according to any criterion that are appropriate.

When the PCS updates the active call priority level, then the PCS also propagates the changed priority details throughout the network 100 to inform all nodes and switching points, such as the MSC 112, the BSC 106, call databases 108, and the destination node 118 that the active call now has a changed priority. This notification of changed priority level acts to prevent any lower priority calls from prematurely terminating the active call. This effect results from the notified equipment rejecting attempts to terminate the call along the system path of the active call. It should be noted that not all nodes and switching points need be notified of the priority change; only those nodes which can be useful in informing users or informing elements of the system that third party early termination of the protected call is forbidden.

In another aspect of the invention, an active call may have multiple monitoring points including the destination point 118. For example, a video streaming of a police hostage situation could be monitored by a central control office as well as by the source and initial destination. In such a situation, any of the possible monitoring points or destinations, if there is an authorized user present, may send a request to the main switch 112 and request a change in priority level. For example, the central police control station which is monitoring the above hostage situation may have authorization to change the priority level of the active call. Thus, the initiator of the call itself need not be the only authorized entity of the active call that can change a priority level of the active call.

Figure 2:
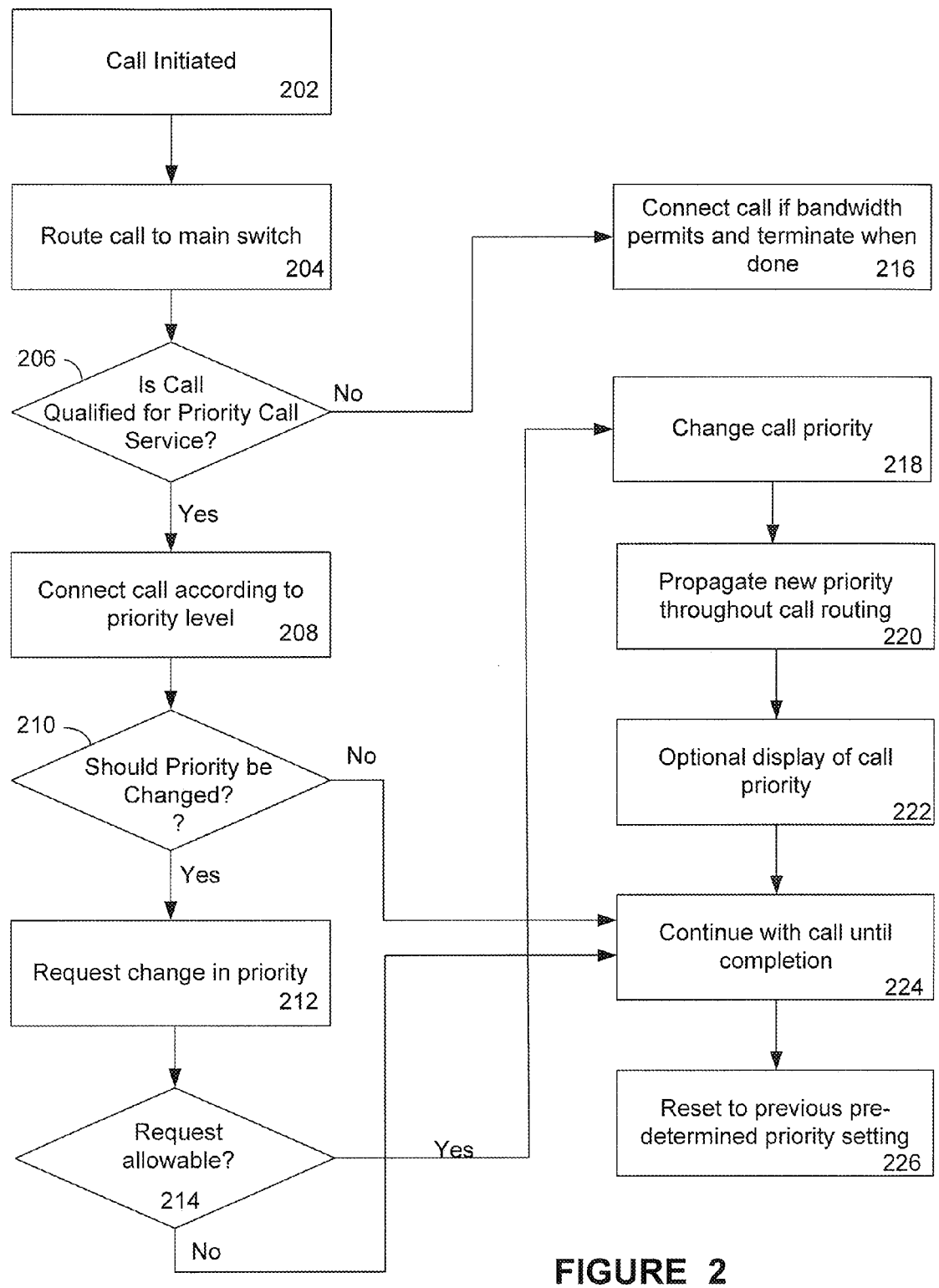
FIG. 2 is an example flow diagram for changing a priority level for an active call.

FIG. 2 is a diagram of an example flow diagram of a method 200 which uses the architecture of FIG. 1. FIG. 2 assumes that the call is initiated from the source equipment 102. A call is initiated at step 202 by source equipment 102. The call is routed through the wireless transport network 110 to the main switching center 112 at step 204. At step 206, call parameters, such as call source and user are examined, using the PCS 120 and the call processing database 114 to determine if the call has a pre-existing priority level. If the user or source has no pre-existing priority level, that is, the call is not entitled to any priority, then the call is connected using the MSC 112 as a normal call depending on available bandwidth in step 216.

If the user of the source equipment or if the source equipment itself has a pre-established priority level, the call is connected according to the pre-established priority level at step 208 becoming an active call. During the active call, events may cause the importance of the call to change. Such events may include an escalation of the importance of the call or a reduction of the importance of the call. At step 210, an authorized user of the priority call system can determine that the active call priority should be changed from its pre-established level to a new and different level. If a change in the pre-established priority level of the active call is not desirable, then the flow of method 200 moves from step 210 to step 224 where the call can continue until completion. If a change in the pre-established priority level of the active call is desirable, then the flow of method 200 moves from step 210 to step 212. Here, the authorized user accesses his equipment, such as a mobile phone or wireless computer terminal, and requests a change in priority.

As indicated above, an authorized user of the active call may be located at any monitoring point, source, or destination point. Any of location points may act as an authorized user to change the priority of an active call. For example, if an authorized source user, such as a policeman establishes a priority active call to a destination in a hostage situation, and the central police command and control center is "patched in" to the call, the police command and control center may be able to change the priority of the active call based on the circumstances of the event.

Returning to the FIG. 2 flow diagram, a change in priority can be requested by an authorized user at step 212. The form of the request may be any analog or preferably digital command sent from the authorized user equipment in the loop of the active call. The request is sent from the authorized user equipment and is received via the active call path to the main switch 112, the call processing database 114, and the priority call server 120. The priority call center, accessing the call processing database determines if the request for a change in priority is allowable at step 214. Here, a call request is evaluated according to criteria that can be programmed into the call server 120 and the database 114. In one simple example, an increase in priority may be rejected if the maximum level for the user is already achieved. For example, any one user, with a priority level of say five, may be able to increase or decrease a priority level to plus or minus one level according to a preset rule. If the change of priority is rejected, the flow moves from step 214 to step 224 where the active call continues at the current priority level until call completion.

If the change request in priority level is allowable, then the flow of method 200 moves from step 214 to step 218 where the change in priority is implemented. The priority call server and the call processing database are updated with the new, changed priority level established at step 218. Then at step 220, the new priority level is propagated throughout the active call routing. This action is taken to ensure that no lower priority call can now preempt the active call because all switching nodes that could preempt the call are aware of the new priority level for the active call. At step 222, the new call priority is displayed. A display of the new priority level for the active call may optionally be displayed at any receiver station associated with the call at step 222. For example, if the destination equipment 118 is so equipped, the PCS 120, using the MSC 112, can supply a displayable notification that the active call has a new priority. At step 224, the active call continues until completion. After active call completion, the call connection is terminated or broken down. At step 226, the call priority is reset to the earlier referenced pre-established priority level. This is done to re-establish the user's pre-existing priority level for future calls.

Figure 3:
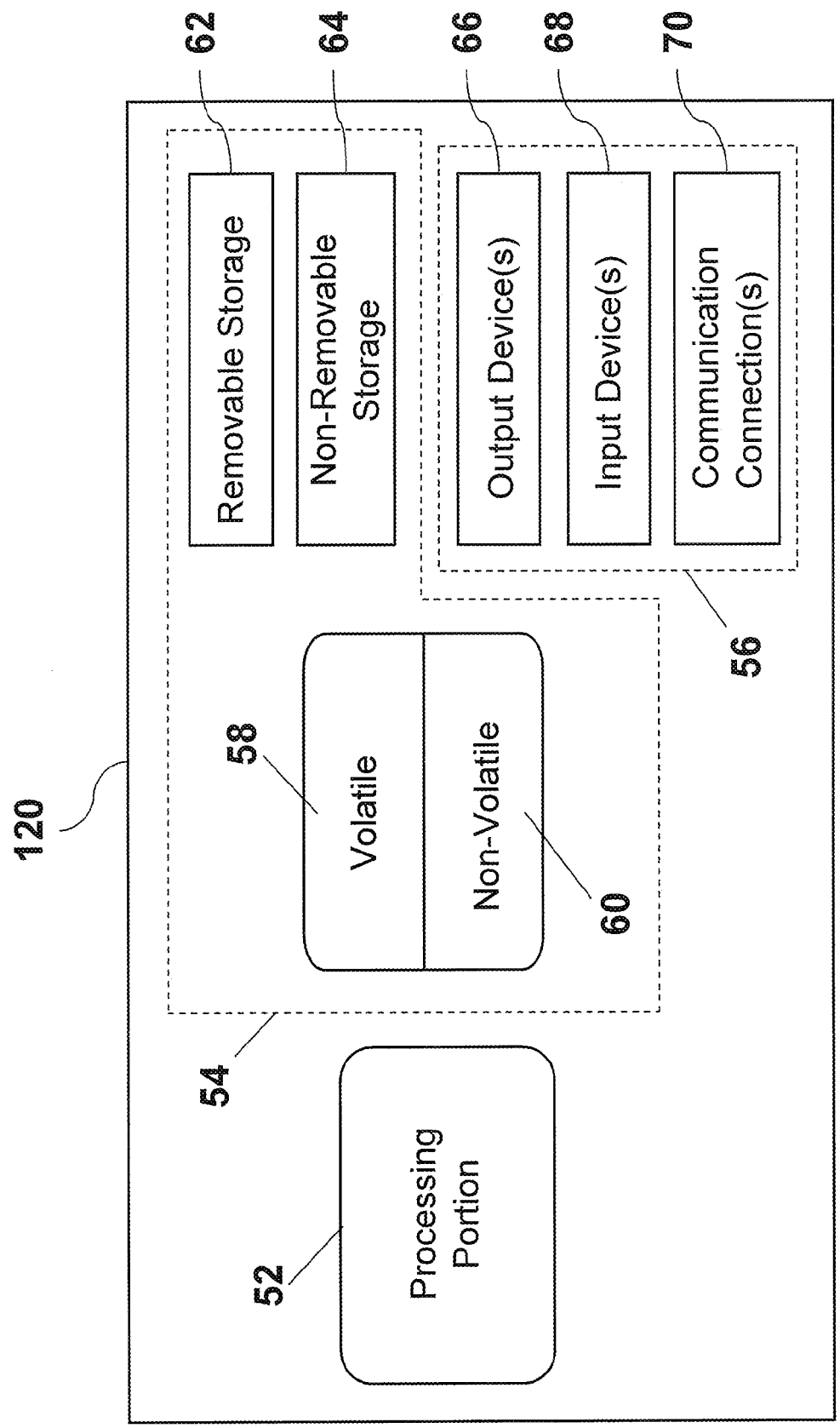
FIG. 3 is a block diagram of an example server for identification and assessment of priority changes of an active call.

FIG. 3 is a block diagram of an example server which can be used as the priority call server (PCS) 120. As described above, the PCS 120 receives requests to change a priority level of a prioritized active call. In an example configuration of FIG. 3, the server includes a processor 60, a memory portion 62, and a communications section 64. It is emphasized that the block diagram depicted in FIG. 3 is exemplary and not intended to imply a specific implementation. Thus, the processor 60 can be implemented in a single processor or multiple processors. Multiple processors can be distributed or centrally located. Multiple processors can communicate wirelessly, via hard wire, or a combination thereof. The memory storage facility 62 may be inclusive of a database such as the call processing database 114 or may be for storage of information related to the priority level of the active call. For example, the memory portion may include authentication storage. Alternately, the authentication may be a remote facility accessed via the communication portion 64. The communication portion 64 couples to the interfaces of the MSC 112 as well as the call processing database and authentication database (not shown) if separate from the server.

Depending upon the exact configuration, the memory portion 62 can include volatile (such as RAM) 66, non-volatile (such as ROM, flash memory, etc.) 68, or a combination thereof. The server 120 can have additional features/functionality. For example, the can include additional storage (removable storage 70 and/or non-removable storage 72) including, but not limited to, magnetic or optical disks, tape, flash, smart cards or a combination thereof. Computer storage media, such as in memory portion 62 may include volatile 66 and nonvolatile 68 memory, removable 70 and non-removable 72 storage media implemented in any method or technology for storage of information such as computer-readable instructions, data structures, program modules, or other data. Computer storage media or medium include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 60. Any such computer storage media can be part of the server 120. The computer readable media having instructions which when executed can perform methods supporting the methods described with respect to FIG. 2.

The server 120 also can have input devices (not shown) such as keyboard, mouse, pen, voice input device, touch input device, and the like. Output devices (not shown) may also be includes such as a display, speakers, printer, and the like. Such input and output mechanisms are well known to those of skill in the art and they support the server 120 functionality.

The following description sets forth some exemplary telephony radio networks and non-limiting operating environments in which a system for priority changes in an active call can be implemented. The below-described operating environments should be considered non-exhaustive, however, and thus the below-described network architectures merely show how the priority change in active calls can be incorporated into existing network structures and architectures. It can be appreciated; however, priority changes in active calls can be incorporated into existing and/or future alternative architectures for communication networks as well.

The global system for mobile communication ("GSM") is a widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of dynamic allocation of communications resources can be applied independently of the method for data transport, and do not depend on any particular network architecture, or underlying protocols.

Figure 4:
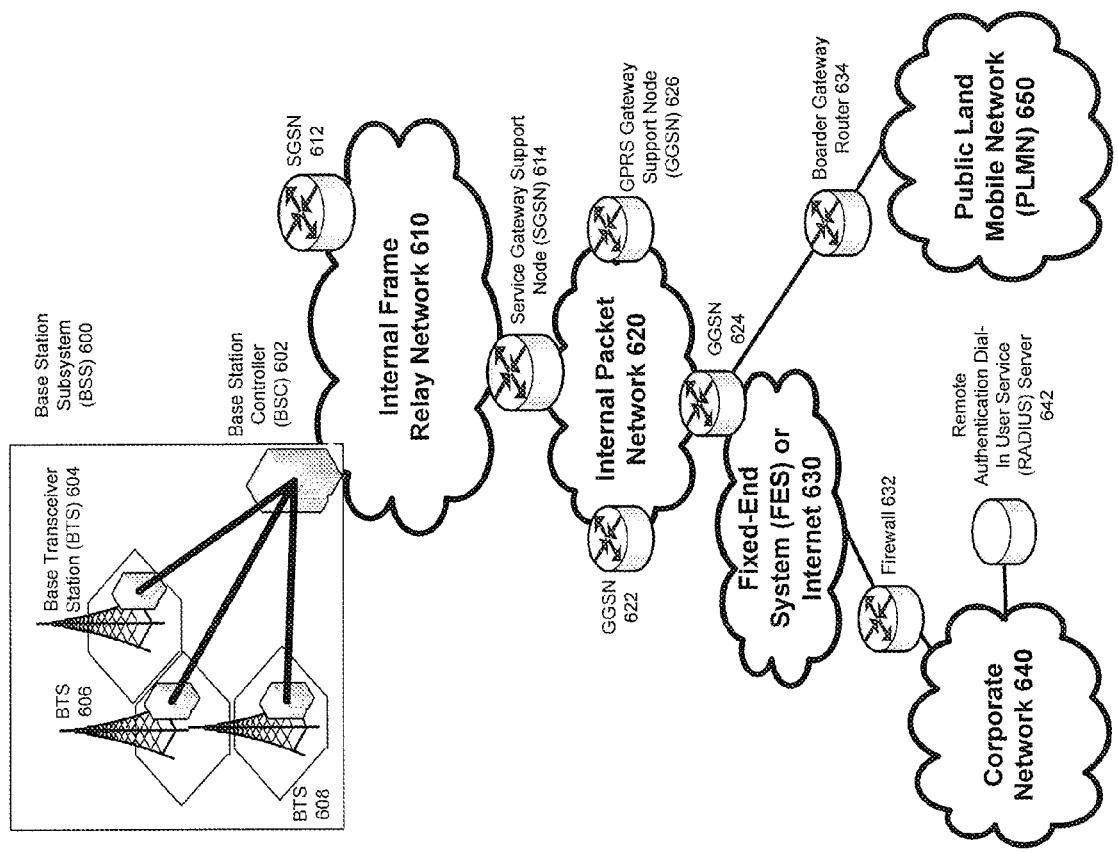
FIG. 4 depicts an overall block diagram of an exemplary packet-based mobile cellular network environment, such as a GPRS network, in which aspects of the invention can be practiced.

FIG. 4 depicts an overall block diagram of an exemplary packet-based mobile cellular network environment, such as a GPRS network, in which active call priority changes may be practiced. In an example configuration, a wireless radio network and cellular radio network and towers are encompassed by the network environment depicted in FIG. 4. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, and the like are the access points where users of packet-based mobile devices (e.g., mobile device 12) become connected to the wireless network. In exemplary fashion, the packet traffic originating from user devices (e.g., user device 102) is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, and the like can route data packets to and from a plurality of gateway GPRS support nodes (GGSN) 622, 624, 626. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via border gateway router 634. The Remote Authentication Dial-In User Service ("RADIUS") server 642 may be used for caller authentication when a user of a mobile cellular device calls corporate network 640.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 5:
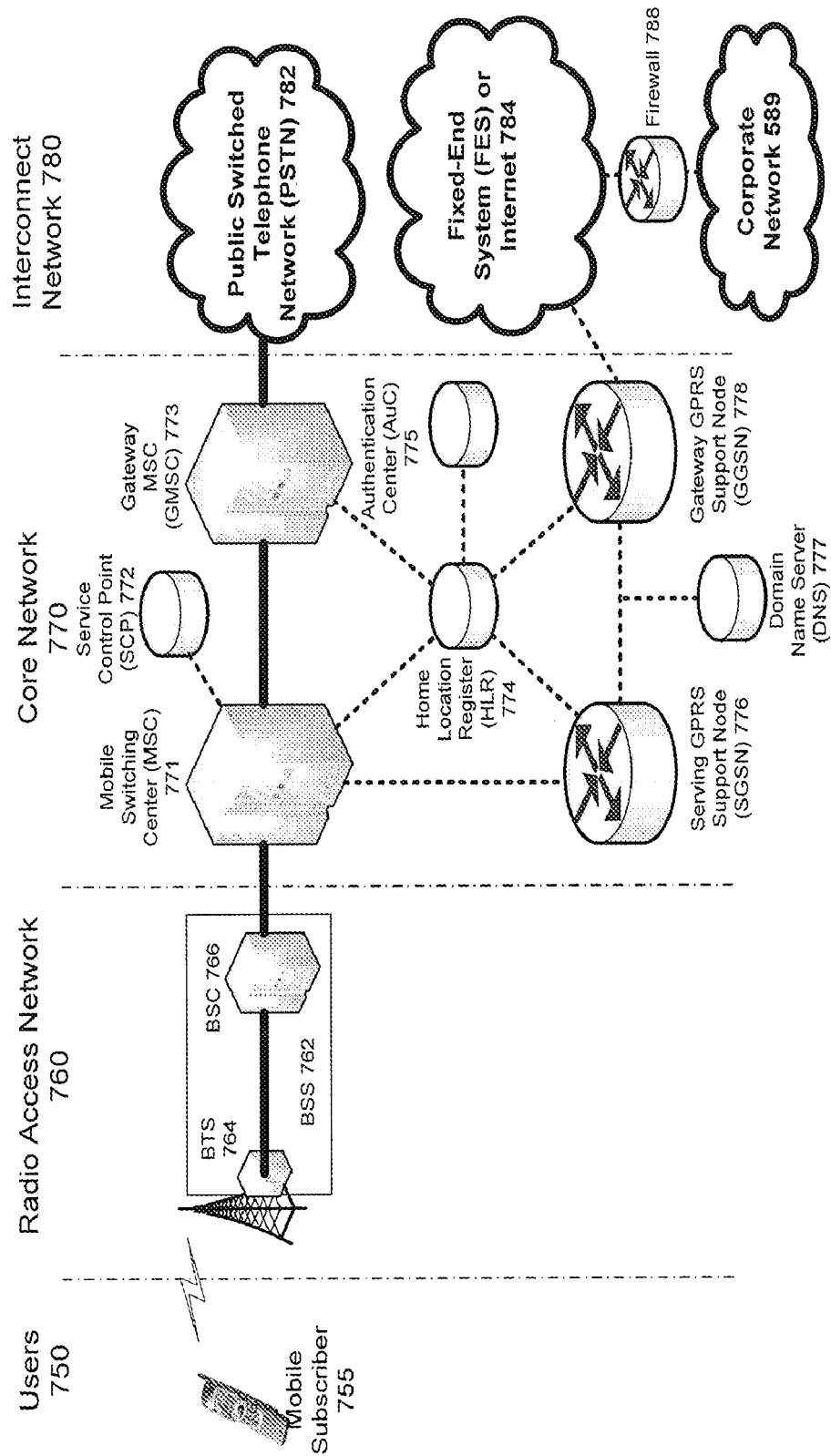
FIG. 5 illustrates an architecture of a typical GPRS network as segmented into four groups.

FIG. 5 illustrates an architecture of a typical GPRS network as segmented into four groups: users 750, radio access network 760, core network 770, and interconnect network 780. In an example configuration the cellular and wireless networks are encompassed by the radio access network 760, core network 770, and interconnect network 780. Users 750 comprise a plurality of end users (though only mobile subscriber 755 is shown in FIG. 5). In an example embodiment, the device depicted as mobile subscriber 755 comprises mobile devices. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 5, interconnect network 780 comprises Public Switched Telephone Network ("PSTN") 782, Fixed-End System ("FES") or Internet 784, firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user (e.g., requester and sometimes to the actual portable device, such as the mobile device used by an end user of the mobile cellular service. When a mobile subscriber turns on his or her mobile device, the mobile device goes through an attach process by which the mobile device attaches to an SGSN of the GPRS network. In FIG. 5, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which can be corporate network 789 in FIG. 5) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 can then go through radio access network 760, core network 770, and interconnect network 780, in a particular fixed-end system or Internet 784 and firewall 788, to reach corporate network 789.

Thus, network elements that can invoke the functionality of dynamic allocation of communications resources can include but are not limited to Gateway GPRS Support Node tables, Fixed End System router tables, firewall systems, VPN tunnels, and any number of other network elements as required by the particular digital network.

Figure 6:
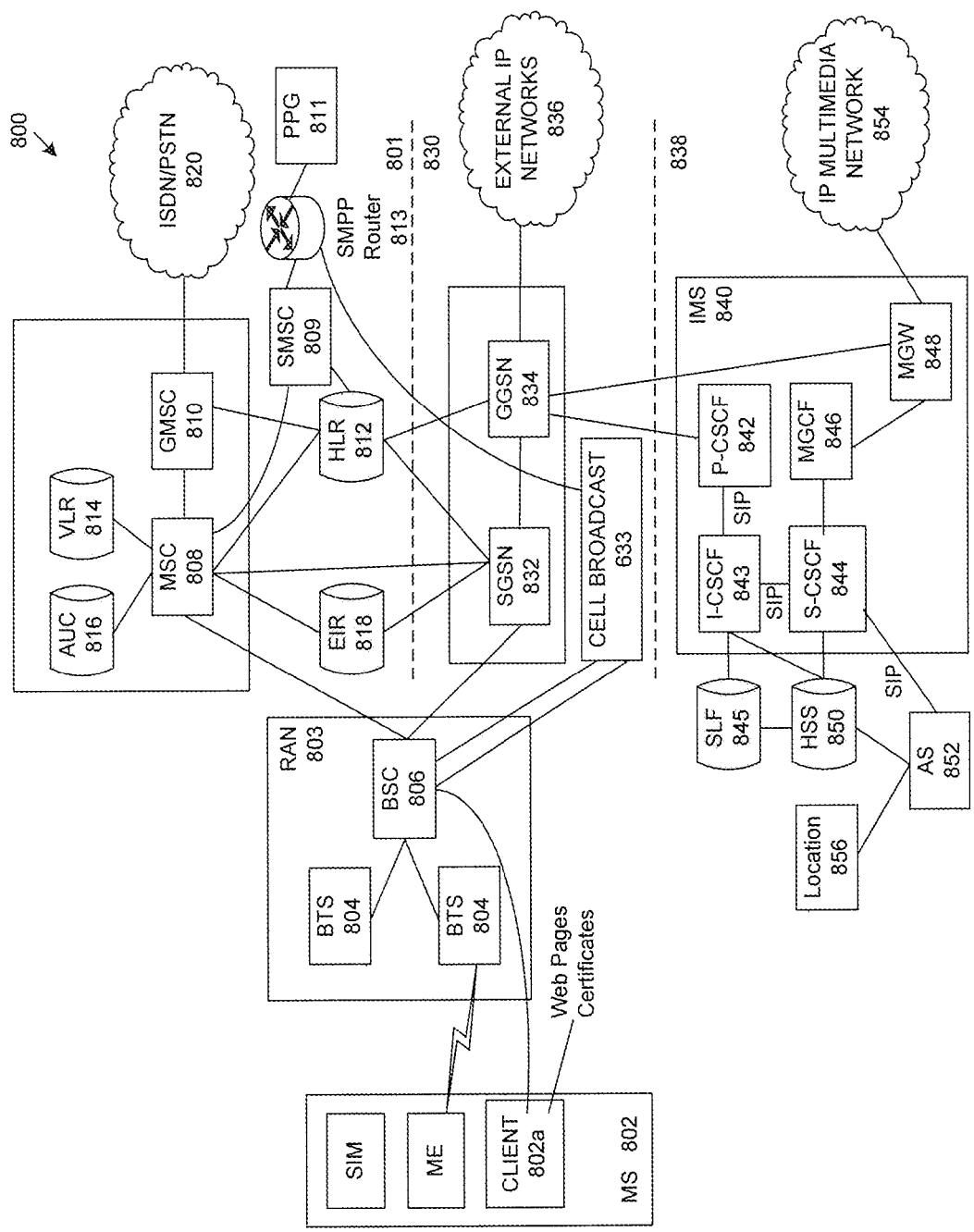
FIG. 6 illustrates an example alternate block diagram of an exemplary GSM/GPRS/IP multimedia network architecture in which aspects of the invention may be practiced.

FIG. 6 illustrates another exemplary block diagram view of a GSM/GPRS/IP multimedia network architecture 800 in which dynamic allocation of communications resources can be incorporated. As illustrated, architecture 800 of FIG. 6 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., mobile device 12) that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., a job site, etc.). When the mobile phones leave the area, they register with the network in their new location as being outside the predefined area. This registration, however, does not indicate the actual physical location of the mobile phones outside the pre-defined area.

While example embodiments of a system that performs changes of call priority level have been described in connection with various computing devices, the underlying concepts can be applied to any computing device or system where the principles of the claimed invention may be implemented. The various techniques described herein can be implemented in connection with hardware or software or, where appropriate, with a combination of both. Thus, the methods and apparatus for changing call priority, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing changes in call priority. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus that performs priority changes in active calls also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing the claimed invention. When implemented on a general-purpose processor, the program code combines with the processor to provide a unique apparatus that operates to invoke the functionality that performs the functions of active call priority change. Additionally, any storage techniques used in connection with a system that performs these functions can invariably be a combination of hardware and software.

While a system that performs active call priority changes have been described in connection with the various embodiments of the various figures, it is to be understood that other similar embodiments can be used or modifications and additions can be made to the described embodiment for performing the same function of priority change without deviating therefrom. For example, one skilled in the art will recognize that a system that performs active call priority changes as described herein may apply to any environment, whether wired or wireless, and may be applied to any number of devices connected via a communications network and interacting across the network. Therefore, the present invention should not be limited to any single embodiment, but rather should be construed in breadth and scope in accordance with the appended claims.

What is claimed is:

1. A method comprising:
   connecting an active call initiated by equipment of a first party to equipment of a second party, the call connected according to a pre-established priority level of the first party;
   determining that the pre-established priority level should be changed;
   receiving a request from equipment of the first party, that the active call be changed to a new priority level;
   determining if the request can be granted;
   changing a priority level of the active call from the pre-established priority to the new priority level;
   propagating information concerning the new priority level for the active call to nodes and switching points in the telecommunications system, wherein the new priority level is honored to prevent the active call from early termination of the call connection;
   continuing call activity until the active call is terminated by either first equipment of the first party or second equipment of the second party; and
   upon termination of the call, resetting the new priority level back to the pre-established priority level, wherein resetting the new priority level back to the pre-established priority level comprises resetting the new priority level in the nodes and switching points in the telecommunications system.

2. The method of claim 1, wherein the active call is one of a voice or a data call.

3. The method of claim 1, wherein determining if the pre-established priority level should be changed comprises making a determination, by the first party, that a change in priority of the active call will be made.

4. The method of claim 1, wherein requesting, by the first party, that the active call be changed to a new priority level comprises entering a priority level change request into telecommunications equipment available to the first party.

5. The method of claim 1, further comprising:
   authenticating the first party as a party authorized to place a call having a pre-established priority level before the step of connecting the active call between first party and the second party.

6. The method of claim 1, wherein the step of displaying the new priority level regarding the active call comprises displaying the new priority level of at least one of first party equipment, second party equipment, or nodes and switching equipment.

7. The method of claim 1, wherein the step of changing the active call from the pre-established priority to the new priority level comprises sending a signal to a main switching element in the telecommunications system requesting a new priority level for the active call.

8. A system comprising:
   a first telecommunications device of first party, the first party having a pre-established call priority level;
   a second telecommunications device of a second party;
   a network switch to connect a voice or data call between the first telecommunications device and the second telecommunications device;
   a server, connected to the network switch, that receives requests from equipment of the first party to change from the pre-established priority level to a new priority level, and grants a change in priority to prevent premature termination of the call connection of the active call by a lower priority call, wherein:
      upon the new priority level being granted, call activity continues until the active call is terminated by either first equipment of the first party or second equipment of the second party; and
      upon termination of the call, the server resets the new priority level back to the pre-established priority level, wherein resetting the new priority level back to the pre-established priority level comprises resetting the new priority level in the nodes and switching points in the telecommunications system.

9. The system of claim 8, wherein the server authenticates the request by verifying that the first party has a pre-established priority calling status.

10. The system of claim 9, wherein the server further confirms that the first party can change from the pre-established priority level to the new priority level.

11. The system of claim 8, wherein the server, after granting the new priority level, propagates the new priority level to other nodes and switches in the telecommunications system to prevent premature termination of the active call by a lower priority call.

12. A computer-readable storage medium, the computer-readable storage medium not being a transient signal, the computer-readable medium having stored thereon computer-executable instructions that when executed by a processor, perform operations comprising:
   receiving a connection request for a call from equipment of a user having a pre-established call priority level;
   verifying that the equipment of the user is authorized to connect a call having the pre-established call priority level;
   connecting the call according to the pre-established call priority level producing an active call of the pre-established call priority level;
   receiving a request to change the pre-established call priority level to a new priority level for the active call;
   changing a priority level of the active call from the pre-established level to the new priority level, wherein the new priority level is honored to prevent the active call from early termination of the call connection by a lower priority call;
   continuing call activity until the active call is terminated by either first equipment of the first party or second equipment of the second party; and
   upon termination of the call, resetting the new priority level back to the pre-established priority level, wherein resetting the new priority level back to the pre-established priority level comprises resetting the new priority level in the nodes and switching points in the telecommunications system.

13. The computer-readable storage medium of claim 12, the operations further comprising propagating the new priority level of the active call to nodes and switches of the telecommunications system.

14. The computer-readable storage medium of claim 12, wherein displaying the new priority level of the active call comprises displaying the new priority level on at least one of a display of the telecommunications server and a display of the user.

* * * * *